(12) United States Patent
Quitmann (10) Patent No.: US 11,764,582 B2
(45) Date of Patent: Sep. 19, 2023

(54) METHOD FOR FEEDING IN ELECTRICAL POWER USING A WIND FARM

(71) Applicant: Wobben Properties GmbH, Aurich (DE)

(72) Inventor: Eckard Quitmann, Bremen (DE)

(73) Assignee: Wobben Properties GmbH, Aurich (DE)

( * ) Notice: Subject to any disclaimer, the term of this patent is extended or adjusted under 35 U.S.C. 154(b) by 24 days.

(21) Appl. No.: 17/622,136

(22) PCT Filed: Jun. 25, 2020

(86) PCT No.: PCT/EP2020/067909
§ 371 (c)(1),
(2) Date: Dec. 22, 2021

(87) PCT Pub. No.: WO2020/260504
PCT Pub. Date: Dec. 30, 2020

(65) Prior Publication Data
US 2022/0263320 A1    Aug. 18, 2022

(30) Foreign Application Priority Data
Jun. 26, 2019   (DE) .......................... 102019117169.5

(51) Int. Cl.
*H02J 3/38*    (2006.01)
*H02J 3/48*    (2006.01)
(Continued)

(52) U.S. Cl.
CPC ............ *H02J 3/381* (2013.01); *F03D 7/0284* (2013.01); *F03D 7/048* (2013.01); *F03D 9/257* (2017.02);
(Continued)

(58) Field of Classification Search
CPC ...... H02J 3/381; H02J 3/48; H02J 3/50; H02J 2300/28; F03D 7/0284; F03D 7/048; F03D 9/257; Y02E 10/72; Y02E 10/76
See application file for complete search history.

(56) References Cited

U.S. PATENT DOCUMENTS 7,989,974 B2 *   8/2011   Fortmann ............... F03D 7/028
                                                        290/44
2008/0265577 A1  10/2008  Fortmann et al.
(Continued)

FOREIGN PATENT DOCUMENTS

DE   10 2005 032 693 A1   2/2007
EP       2 256 341 A1    12/2010
(Continued)

*Primary Examiner* — Joseph Ortega
(74) *Attorney, Agent, or Firm* — Seed IP Law Group LLP (57) ABSTRACT

A method for feeding electrical power into a grid at a grid connection point using a wind farm having installations connected to the point using transmission lines. The farm controller transmits active and reactive power specifications to the installations. A first power range is respectively specified at each installation and spans a range of values for active and reactive power to be fed in. The first power range has an active power limit to be complied with by the installation and a reactive power limit which can be reached by the installation and a second power range is specified at the grid connection point and spans a range of values for active and reactive power to be fed in. At least one installation respectively exceeds the active power limit, and the second power range is complied with by the wind farm at the grid connection point.

15 Claims, 3 Drawing Sheets

(51) Int. Cl.
   *H02J 3/50*   (2006.01)
   *F03D 7/02*   (2006.01)
   *F03D 9/25*   (2016.01)
   *F03D 7/04*   (2006.01)

(52) U.S. Cl.
   CPC .................................... *H02J 3/48* (2013.01);
       *H02J 3/50* (2013.01); *H02J 2300/28* (2020.01)

(56) References Cited

U.S. PATENT DOCUMENTS

| | | |
|---|---|---|
| 2010/0312409 A1 | 12/2010 | Zeumer et al. |
| 2011/0133461 A1 | 6/2011 | Hjort |
| 2014/0248123 A1 | 9/2014 | Turner et al. |
| 2016/0308369 A1 | 10/2016 | Gupta et al. |

FOREIGN PATENT DOCUMENTS

| | | |
|---|---|---|
| WO | 2007/006565 A2 | 1/2007 |
| WO | 2009/036895 A2 | 3/2009 |

\* cited by examiner

METHOD FOR FEEDING IN ELECTRICAL POWER USING A WIND FARM

BACKGROUND

Technical Field

The present invention relates to a method for feeding electrical power into an electrical supply grid by means of a wind farm. The invention also relates to a wind farm which can carry out such a method.

Description of the Related Art

Wind power installations are known; they produce electrical power from wind and feed this power into an electrical supply grid. A plurality of wind power installations are often combined in a wind farm and feed power into the electrical supply grid via a common grid connection point. Such a common grid connection point may have, in particular, a so-called grid transformer which is used to feed power into the electrical supply grid even if this need not be absolutely necessary. The grid connection point can also be referred to as a feed-in point. In any case, such grid connection points are designed for a feed-in power which must not be exceeded. Exceeding this feed-in power would often result in the tripping of a safety device; in particular, the feed would be interrupted by a grid disconnection switch in such a case. The maximum feed-in power is generally contractually agreed with the grid operator.

In order to be able to ensure that the designed feed-in power is complied with, the wind power installations are accordingly dimensioned or set to this power limit at the grid connection point or the power limit at the grid connection point is matched to the total power of the wind power installations in the farm, as planned. In the simplest and clearest case, this may mean that the wind power installations in the wind farm are designed in such a manner that, if there is a nominal wind speed, they all together produce in total exactly as much power as can and may be fed in at the grid connection point.

The respective operating setting of each wind power installation often takes into account in this case not only the active power which can be produced but also the fact that a reactive power exchange possibly required by the grid operator can also be additionally ensured. Each wind power installation is therefore designed to feed in a predetermined active power in appropriate wind conditions with the simultaneous ability to feed in a predetermined reactive power. In this case, the reactive power can be fed in or consumed; this corresponds to the behavior of an over-excited or under-excited synchronous generator. The term reactive power feed is used below for the purpose of simplification and includes feed and consumption.

However, if the potentially available reactive power is not demanded at an operating point, it may be the case that, even at nominal wind speed, a wind power installation could still increase its active power which can be fed in, which could prevent compliance with the active power limit of the grid connection point, however. The relevant wind power installation would then not be optimally used, at least as long as the potentially available reactive power is not demanded.

Remedial action could be provided by increasing the power limit of the grid connection point. However, such a measure may be very expensive and it may sometimes even be impossible, specifically if the power limit of the grid connection point is limited in the range of this grid connection point by the properties of the electrical supply grid.

The German Patent and Trademark Office searched the following prior art in the priority application for the present application: US 2014/0248123 A1; DE 10 2005 032 693 A1; US 2016/0308369 A1 and US 2011/0133461 A1.

BRIEF SUMMARY

One or more embodiments are directed to using a grid connection point as efficiently as possible when feeding in electrical power.

A method is provided. The method relates to the feeding of electrical power into an electrical supply grid. The power is fed in at a grid connection point by means of a wind farm. Such a wind farm has a plurality of wind power installations and the latter therefore feed their power into the electrical supply grid at the one grid connection point, as intended.

In order to carry out the method, the wind power installations are connected to the grid connection point using transmission means. Such transmission means are, in particular, transmission lines (overhead lines or underground cables). However, transformers also come into consideration, in particular additionally, and can be used to change a voltage level, in particular.

A farm controller is also provided for the purpose of controlling active and reactive power specifications at the grid connection point, which farm controller transmits active and reactive power specifications derived therefrom to the wind power installations for this purpose. Such a farm controller is therefore provided for the purpose of carrying out control for the wind farm. In particular, the farm controller can be used to control power management. For this purpose, the farm controller has, in particular, a measuring device at the grid connection point, analysis and calculation algorithms and the possibility of transmitting active and reactive power specifications to one, a plurality of or all wind power installations in the wind farm. The active and reactive power specifications may be individually transmitted to each wind power installation, for example as specific power values, or as percentage values, to name a further example.

It is also proposed that a first power range is respectively specified at each of the wind power installations, which first power range spans a range of values for an active and reactive power to be fed in and may differ between the wind power installations. This first power range is specified by two limits, in particular. It specifically has an active power limit to be complied with by the wind power installation and a reactive power limit which can be reached by the wind power installation.

The active power limit to be complied with is therefore a limit which indicates, in terms of magnitude, maximum values for the active power; these values should not be exceeded during operation. In this case, the reactive power limit which can be reached is a limit which must be able to be reached by the wind power installation. The wind power installation must therefore be able to feed in reactive power up to the reactive power limit if this is demanded.

In this case, it is taken into account, in particular, that these two limits may be related. In particular, the reactive power which can be achieved can depend on an active power which has been set. Both the active power and the reactive power fundamentally denote here powers to be output by the wind power installation. The relationship between these limits may be represented, in particular, in an active power/reactive power graph and the limits form an area or enclose an area therein.

For example, a reactive power limit may specify a reactive power value which is to be at least achieved but which must be able to be achieved only within active power limits or ranges which are likewise specified. For example, provision may be made for this specified reactive power value to not have to be able to be achieved in the case of low active powers, but rather for the reactive power in kilovolt-Ampere reactive (kVAr) to not need to be greater than the active power in kilowatt (kW), for example.

Furthermore, the method is configured in such a manner that a second power range is specified at the grid connection point and spans a range of values for active and reactive power to be fed in, wherein the second power range has an active power limit to be complied with by the wind farm at the grid connection point and has a reactive power limit which can be reached by the wind farm at the grid connection point.

Fundamentally, a second power range is therefore specified at the grid connection point in the same manner as it is specified as a first power range at a wind power installation. However, the first power range and the second power range may differ in terms of the values and possibly also the type or form. In particular, the power values in the second power range both of the active power limit to be complied with and of the reactive power limit which can be reached at the grid connection point will be greater, in particular a multiple greater, than the values at each wind power installation. Ideally, each limit of the second power range could result from the sum of all corresponding limits of the first power range of the relevant wind power installations, which is mentioned here only for the purpose of explanation. However, this can actually be assumed to be only idealizing, and influences of the transmission means also play a role, however. The grid operator usually specifies what specific reactive power value must be achieved by a wind farm at the grid connection point in a certain situation. This point is within the second power range, the maximum range, which must be able to be achieved by the wind farm, in principle.

All of these wind power installations in the wind farm then operate in such a manner that they produce active and reactive power, in each case taking into account specifications of the farm controller, and transmit said power to the grid connection point. The fact that, for example, one wind power installation or a plurality of wind power installations temporarily fail(s) and only the remaining wind power installations then each produce corresponding active and reactive power and transmit said power to the grid connection point also comes into consideration. One of the wind power installations should at least do this.

Provision is also made for the individual wind power installations to respectively exceed their active power limit of the first power range to be complied with. This may apply to all wind power installations, a plurality of wind power installations or at least one of the wind power installations. It is therefore proposed that more power than is actually allowed or provided on the basis of the active power limit of the relevant first power range to be complied with is deliberately produced by at least one or more wind power installations and is transmitted to the grid connection point. The result is therefore that the first power range is respectively no longer complied with by the wind power installations or at least by the one wind power installation.

In this respect, however, it is simultaneously proposed that the active power limit to be complied with by the respective wind power installation is respectively exceeded in such a manner that the second operating range is complied with by the wind farm at the grid connection point.

The first power range is therefore deliberately exceeded, but the second power range should be strictly complied with. In this case, it was identified, in particular, that it is actually also possible to exceed the first power range without leaving the second power range. In this case, it was identified, in particular, that the power ranges may be distorted on account of the influence of the transmission means, with the result that leaving the first power range need not result in the second power range being left.

The wind power installations which each leave the first power range do so only taking into account specifications of the farm controller, however. These wind power installations are therefore controlled by the farm controller at least to this extent. In particular, the farm controller can monitor the compliance with the second power range at the grid connection point and, on the basis of this, can transmit appropriate specifications, specifically, in particular, for the active and reactive power to be fed in, to the respective wind power installations.

This may also mean, in particular, that the farm controller captures the active and reactive power respectively currently being fed in at the grid connection point and also determines a distance between this active/reactive power and the limits of the second power range and, on the basis of this, transmits appropriate specifications for active and reactive power to the respective wind power installations. This may also depend, in particular, on what active and reactive power specifications have been previously transmitted to the corresponding wind power installations.

If it is therefore identified, for example, that the active power currently being fed in at the grid connection point could still be increased by 10% on the basis of the active power limit to be complied with at the grid connection point, this can be implemented, for example, such that all active power specifications are increased by 10%. Each wind power installation then checks whether it can still increase its active power by 10% or less and exceeds its first power range in a controlled manner in this case. However, this is only an illustrative example and provision may also be made, for example, for the active and reactive power specifications for the individual wind power installations to be individually changed.

It was also identified that it is necessary to avoid leaving the second power range, in particular exceeding the active power limit to be complied with at the grid connection point, which leaving may often even result in inevitable disconnection of the wind farm from the electrical supply grid. In particular, safety precautions may result here in the opening of appropriate safety contactors.

However, such a consequence cannot be immediately expected in the respective wind power installations in the wind farm. In this case, it was also identified that the design of the wind power installation, which comprises such a specification of the active power limit to be complied with at the respective wind power installation in particular, is respectively fundamentally based on design limits which need not be present in the specific case, however.

For example, an active power limit may be protection against overheating. However, such overheating is usually not achieved if an active power limit specified for protection is briefly exceeded. Depending on the extent to which the active power limit is exceeded, even permanent exceeding may be acceptable, for example in the case of particularly cold ambient temperatures. Whether such an active power limit should therefore always be strictly complied with at a wind power installation can depend on many factors, yet further ones of which are also described below, and is fundamentally open to an individual assessment.

One embodiment proposes that at least one, a plurality of or all of the wind power installations is/are respectively controlled in such a manner that a reactive power limit of the first power range respectively cannot be reached, whereas the wind farm can reach the reactive power limit of the second power range.

This is based, in particular, on the consideration that the transmission means have a particularly great influence on the transmission of the reactive power. This may mean, for example, that an operating point at the wind power installation, which is defined by the active power and reactive power output by the wind power installation, results in a distortion by virtue of the transmission to the grid connection point such that this operating point of a wind power installation results in an operating point at the grid connection point which has a greater reactive power component.

It was also identified that, in particular, the output of a very high active power component of the wind power installation, in particular if it is above the active power limit of this wind power installation, only makes it possible to output a comparatively low reactive power component. This may be caused, for example, by current limitation which limits the apparent current. If a high active power, and therefore a high active current, is output, the upper limit for the apparent current is already almost reached and only little reactive current can be additionally output before the apparent current reaches said current limit.

However, the transmission of this apparent current via the transmission means to the grid connection point may result, for example as a result of an inductive behavior of the transmission line, in a shift in the phase angle of the current, which may result in a higher reactive current component and therefore reactive power component. This shift may result in apparently insufficient reactive power being output or being able to be output at the wind power installation and, as a result of the influence of the transmission infrastructure, sufficient reactive power nevertheless being provided or being able to be provided based on the grid connection point.

This is also based on the recognition that such a reactive power specification at the wind power installation actually serves only to guarantee a sufficient reactive power at the grid connection point. Such a reactive power output possibility, which could also be referred to as the ability to set the reactive power, will often be required only at the grid connection point, specifically to support the local voltage of the electrical supply grid. In this case, the compliance with such a reactive power limit at the wind power installation may usually have been stipulated only as an indirect specification to comply with the achievable reactive power at the grid connection point.

Whereas the farm controller, or a sensor provided therefor, at the grid connection point can check the compliance with the active power limit at the grid connection point directly by means of measurement or evaluation of a measurement, a different approach is proposed for the reactive power to be complied with. In order to comply with the achievable reactive power at the grid connection point, it is proposed, in particular, that the properties of the transmission means are taken into account computationally or in a simulation. The properties may be measured or derived from the physical conditions for this purpose. A derivation from the physical conditions, how long corresponding transmission lines are and what electrical properties the latter have can also be carried out by means of a simulation. Additionally or alternatively, the phase angle obtained in a current and voltage measurement can be used to determine the transmission behavior with respect to the reactive power.

The fact that the change in these reactive powers through the transmission means is derived from the power output by the wind power installations and the reactive power which is established at the grid connection point also comes into consideration. In order to illustrate this using a simple example which is based on a linear behavior, a reactive power of 10% which is output by the wind power installation could result in a reactive power of 20% at the grid connection point, for example. If a reactive power of 40% has to be achieved at the grid connection point, this would mean that the wind power installation would have to achieve a reactive power of 20%.

One embodiment proposes that at least one, a plurality of or all of the wind power installations is/are respectively controlled in such a manner that it/they respectively output(s) an output power with an active and a reactive power component for transmission to the grid connection point. For this purpose, it is proposed that the output power exceeds the active power limit of the first power range to be complied with. The active power is therefore greater than would be permissible according to the first active power limit to be complied with at the wind power installation according to the steady design criteria.

Additionally or alternatively, it is proposed that the output power has an apparent power value which is so large that the reactive power limit of the first power range cannot be reached without reducing the active power component. In this case too, an excessively large active power component is therefore produced and output at the wind power installation. The fact that the active power component is excessively large may mean that, although it is below the active power limit to be complied with, it results in such a large apparent power value that the reactive power limit of the first power range, that is to say at the wind power installation, cannot be reached. The reactive power limit could be reached only if the active power component is reduced.

The possibility of the output active power also being so high that it exceeds the active power limit to be complied with at the wind power installation also comes into consideration, however.

For both of these variants or at least one of these variants, however, it is proposed that the transmission means entirely or partially results in such a change in the output power that the second power range, that is to say the power range at the grid connection point, is complied with. The active power production and output at the wind power installation is therefore deliberately virtually exhausted and even overstretched, but such that the resulting values are complied with at the grid connection point.

In this respect, a known property of the transmission means, in particular a topology of the wind farm grid or at least a part of the latter, can be taken into account when producing the active and reactive power and outputting it at the wind power installation. However, the fact that the farm controller reports up-to-date information relating to the situation at the grid connection point back to the wind power installations and, on the basis of this, the latter control the described overstretching of the power production and output also comes into consideration.

In this case, it was identified, in particular, that such overstretching, that is to say increasing of the active power, is possible and the yield can be increased as a result. In particular, previous strict compliance with the first power range, that is to say the power range at the wind power installation, has proved to be sometimes too restrained.

In particular, it was also identified here that isolated consideration of active power, on the one hand, and reactive power, on the other hand, is not optimum and it is therefore proposed that the output power with an active and reactive power component is considered, specifically, in particular, with respect to the first and second power ranges to be complied with.

One embodiment proposes that the transmission means reduces the output active power component of the output power output for transmission by means of thermal consumption in such a manner that the active power limit of the second power range is complied with. In particular, resistive losses or the resistive behavior of the transmission means may be known here, for example, and may be concomitantly taken into account when producing and outputting the active power component of the individual wind power installation during operation outside the first power range.

In this case, it was identified, in particular, that active power would possibly be donated, that is to say less power is taken from the wind and converted into electrical active power than would be possible if such losses were not taken into account. In such a case, for the supposed protection of the grid connection point, an active power range could be complied with at the wind power installation even though ultimately less active power arrives at the grid connection point and therefore the active power range which would be possible at the grid connection point is not exhausted. In this case, it was identified that such exhaustion of the possible active power range at the grid connection point may mean that a limit is exceeded at the wind power installation. However, if such exceeding of a limit for the active power is permissible in moderation, this may be a useful option.

Additionally or alternatively, it is proposed that the transmission means results in such a change in the reactive power component of the output power which has been output that the reactive power limit of the second power range is reached, that is to say, in particular, the reactive power values which are typically specified by the grid operator and are within the reactive power limit of the second power range are achieved. In this case too, it was identified that, in some situations, the reactive power limit need not be able to be reached at the wind power installation because the transmission means causes, in particular, a phase shift of the transmitted current such that the reactive power limit of the second range, that is to say at the grid connection point, can nevertheless be reached. In this case too, this makes it possible to feed in a higher active power since the active and reactive power are associated in this respect and, if it is possible to reduce the reactive power, this may result in it being possible to increase the active power as a result.

One configuration proposes that the sum of all output powers of the wind power installations before transmission by means of the transmission means does not comply with the second power range, whereas the sum of all output powers transmitted to the grid connection point complies with the second power range at the grid connection point. This is based on the recognition that it is possible to comply with the active power limit at the grid connection point, in particular, even though all wind power installations together produce more active power and transmit it to the grid connection point than would be permissible at the grid connection point. However, the same may also apply to the reactive power, specifically in so far as it is possible for all wind power installations together to not be able to reach the reactive power limit at the grid connection point with the sum of their achievable reactive powers and nevertheless for the reactive power limit to be able to be reached at the grid connection point after transmission via the transmission means of the wind farm.

One configuration proposes that one wind power installation, a plurality of wind power installations or all of the wind power installations exceed(s) its/their active power limit of the first power range to be complied with, that is to say at the respective wind power installation, in each case on the basis of a plurality of test conditions. The active power limit to be complied with in each case therefore cannot be readily exceeded, but rather there is a need for a special test in order to determine whether this is acceptable.

In this case, compliance with a farm specification of the farm controller is proposed as at least one test condition. The farm controller can therefore specify how, for example, an active power upper limit should be divided among the individual wind power installations. The wind power installation then exceeds the active power limit to be complied with, but only in so far as this test condition, specifically here the compliance with the farm specification of the farm controller, is ensured.

Additionally or alternatively, compliance with an installation condition of the respective wind power installation is tested as at least one test condition. Such an installation condition is explained in yet more detail below and may relate to the compliance with a maximum temperature at a component of the wind power installation, for example.

At least one farm specification and at least one installation condition are preferably tested, that is to say both types of condition are tested.

At least two installation conditions are preferably tested in this case. For example, testing is therefore carried out in order to determine whether a temperature range is complied with at the wind power installation and whether a mechanical load limit is complied with at the wind power installation. In this case, it was identified, in particular, that the active power limit of the first power range to be complied with, that is to say at the wind power installation, is not intended to be recklessly exceeded and that very different individual load limits which may also be independent of one another should be taken into account for this purpose, with the result that the consideration of a single condition is not sufficient or not adequate enough. In particular, it was identified that a mechanical limit can be complied with without complying with a thermal limit and vice versa, to remain with the above example. Therefore, at least two installation conditions are preferably tested.

One embodiment proposes that the installation condition is one of the conditions described below. If a plurality of installation conditions are tested, they may be accordingly a plurality of the conditions described below.

One possible installation condition is the compliance with an extended power range at the respective wind power installation, which extended power range is greater, at least in sections, than the first power range of the same wind power installation. A further power range is therefore placed around the first power range and can therefore achieve the situation in which, if the first power range is exceeded, it is at least not exceeded by an arbitrary amount. A first safety limit can therefore be provided.

A further or different installation condition may be the compliance with a predetermined maximum temperature in the respective wind power installation. For this purpose, it is possible to consider, in particular, components critical to producing or feeding in power. This may be, for example, a temperature at a power semiconductor switch which is used for frequency inversion. A temperature at a winding of the generator also comes into consideration.

In this case, it was identified, in particular, that some power limits which are used to protect the installation are actually aimed at preventing overheating. In this respect, such power limits for protecting against overheating are also useful and should not be recklessly ignored. Nevertheless, it may be permissible, however, to exceed the power in the light of the relevant temperature or if a plurality of temperatures are taken into account.

In this case, on the one hand, the idea that an increased power, in particular combined with an increased current, does not immediately result in overheating because most systems are considerably more sluggish in terms of their thermal behavior than in terms of the electrical behavior plays a role. A temperature behavior also depends on ambient temperatures. If the ambient temperatures are therefore comparatively low, for example, specifically lower than a design temperature, a greater or longer power super elevation may be acceptable before overheating occurs.

A further or alternative condition is the compliance with a predetermined maximum current in the respective wind power installation. Such a maximum current may be a current in the generator, in particular a stator current. Such a current may result in a specific load for corresponding elements, such as the generator in this example.

However, an output current which is output by the wind power installation also comes into consideration, for example. Such an output current may also result in immediate loads, and it is therefore proposed to test the compliance with a predetermined maximum current as an installation condition.

The compliance with a predetermined mechanical maximum load of the respective wind power installation is proposed as a further or alternative condition. This is actually based on the idea that an excessively high output of active power can also mean that a correspondingly high power is taken from the wind. This results in a corresponding mechanical load on the affected components. The rotor blades and the rotor hub should be mentioned, in particular, here. In the case of gearless installations, a shaft journal which carries the rotor hub together with rotor blades and also carries the generator, at least the rotor of the generator, also comes into consideration. The transitions between said elements and other fastenings, in particular of the generator on the rest of the nacelle, can also have a high mechanical load in the case of a high active power output.

In this case, it was also identified, in particular, that it is less tolerable to exceed a mechanical limit than to exceed a power limit which could result in a temperature increase only after a time delay. In particular, it was identified that the exceeding of the active power limit to be complied with can at least temporarily result in highly tolerable temperature values, in particular in the case of ambient temperatures which are below the design temperatures, while it can simultaneously result in mechanical loads which cannot be tolerated.

In addition, a high mechanical load cannot be tolerated even if it occurs once, in particular if it results in a fracture, whereas thermal loads more likely lead to a reduction in the service life of the wind power installation. This may be acceptable, in particular when the reduction in the service life leads to an overall service life which is still longer than the approved operating time, however.

In particular, it is preferably proposed that the active power limit of the first power range is specified and/or monitored on the basis of a predicted service life of the wind power installation.

It is preferably proposed that it is permissible to exceed the first power range while complying with the extended power range only if at least one criterion of the installation conditions explained above, which in this respect form a list of conditions, is complied with. In particular, it is proposed that it is only permissible as long as at least two criteria in the list of conditions are complied with, and further preferably as long as all criteria in the list of conditions are complied with.

In particular, a simplified test criterion is taken as a basis here, in the case of which the exceeding of the first power range is initially limited by the further power range. Therefore, a safety limit is defined for the exceeding in a first step. Testing is then additionally carried out in order to determine whether at least one of the further conditions is complied with and, if the at least one condition, the plurality of conditions or all of the other conditions is/are complied with, the first power range can be exceeded. As a result, additional active power can possibly be fed in, while compulsory conditions, which therefore avoid danger to the installation, are taken into account at the same time. The criterion that the second power range is complied with at the grid connection point should naturally also always be complied with. This can be achieved, for example, by complying with target values or limit values which are transmitted by the farm controller to the relevant wind power installation.

It is therefore preferably proposed that it is always permissible to exceed the first power range while complying with the extended power range if the second power range is also complied with at the grid connection point, if at least one of the criteria in said list of conditions is complied with and, in any case, if a plurality of or all of the criteria in the list of conditions are complied with. This enables a positive and conclusive test. In particular, it was identified that said conditions in the list of conditions, in any case if all conditions are complied with, can suffice to define such an exceptional situation for exceeding the first power range.

Additionally or alternatively, it is proposed that the extended power range can be exceeded for a predetermined exception period if the predetermined mechanical maximum load is complied with and, in particular, the other criteria in the list of conditions, or at least one of said criteria, is/are complied with. This makes it possible to feed in even more power if appropriate if even the extended power range is also exceeded. Danger to the installation can be excluded by complying with the conditions and, in particular, by complying with the predetermined mechanical maximum load.

Additionally or alternatively, it is proposed that the predetermined maximum temperature is predetermined on the basis of a predetermined tolerance period. This is based on the idea, in particular, that an excessively high temperature can often result in intolerable damage only during continuous loading or at least loading for longer, and this predetermined temporal limit of the predetermined maximum temperature by means of the predetermined tolerance period is therefore proposed.

It is preferably proposed to improve this even further, specifically to specify at least one first predetermined maximum temperature for a first predetermined tolerance period and to specify at least one second predetermined maximum temperature for a second predetermined tolerance period, wherein the first predetermined maximum temperature is less than the second predetermined maximum temperature and the first predetermined tolerance period is greater than the second predetermined tolerance period. It is therefore possible to specify different maximum temperatures, that is to say temperature limit values, for periods of different lengths.

In this case, a first longer tolerance period is accordingly predetermined for the first, lower maximum temperature and the second predetermined maximum temperature can be selected to be higher, but only for a shorter time, specifically only for the shorter, second predetermined tolerance period.

This is based, in particular, on the idea that a smaller power increase for a longer time may sometimes be more expedient depending on the situation, specifically, in particular, depending on the overall situation of the wind farm and/or at the grid connection point, whereas not much time is available in other situations and as much power as possible is intended to be fed in during this time. If, for example, the exceeding of the power at the wind power installation is greatly limited by a comparatively small margin owing to the compliance with the second power range at the grid connection point, an accordingly small power increase, which is then preferably carried out for as long as possible, would then be more useful.

Additionally or alternatively, it is proposed that the predetermined maximum current can be exceeded for a predetermined second exception period if the predetermined mechanical maximum load is complied with and, in particular, the other criteria in the list of conditions are complied with. In this case, it was identified that a time limit may also be useful for the maximum current. On the one hand, a high current, sometimes only for a relatively long time, can entail damage which can no longer be tolerated or an impairment which can no longer be tolerated, but, on the other hand, a high current may also result in a thermal load, specifically at an element, the temperature of which is not measured, with the result that the temperature cannot be checked and the current is monitored instead.

It was also identified that a mechanical load should additionally be complied with and in this case it was identified, in particular, that a high current can result in a mechanical load. This applies, in particular, in the case of a high stator current which can result in a high generator torque. However, it may also apply to other currents which may result indirectly in a high generator current and a generator torque, for example.

Additionally or alternatively, it is very generally proposed that the compliance with the predetermined mechanical maximum load must always be ensured. This is based on the recognition, in particular, that a temporal consideration, as is proposed for the thermal loads and was explained above, applies to a lesser extent to a mechanical load. It was also identified that the mechanical load is achieved, however, only when the power is greatly exceeded, with the result that the consideration of the mechanical maximum load allows the active power limit which is to be complied with, in particular, to be exceeded to a comparatively great extent, but is comparatively intolerant to yet further exceeding or to mechanical overloading.

One embodiment proposes that the farm specification comprises at least one farm specification value output to each wind power installation. The farm specification value may be an active power maximum value to be complied with by each wind power installation or may be a reactive power value to be achieved by each wind power installation. It is also possible to provide a plurality of farm specification values, at least one of which is the active power maximum value to be complied with or comprises the latter as a value, and at least one other of which is the reactive power minimum value to be achieved by each wind power installation or comprises this value. In order to comply with the second power range, it is therefore proposed that the farm controller generates appropriate farm specification values and transfers them to the wind power installations, or at least one farm specification value.

For this purpose, it is preferably proposed that the at least one farm specification value is determined by the farm controller on the basis of the second power range and an instantaneous power fed in at the grid connection point. The farm controller therefore checks the extent to which the second power range is currently complied with and can then accordingly adapt the farm specification values. If the farm controller identifies, for example, that an active power which is 20% below an active power limit at the grid connection point is currently being fed in at the grid connection point, the farm specification value, if it relates to the active power maximum value to be complied with, can be accordingly increased. Provision is preferably made for an upper limit to be provided for such a variable active power maximum value which is regularly newly determined by the farm controller.

The at least one farm specification value is preferably output as a relative value. In particular, a percentage value which relates to the nominal power of the wind power installation comes into consideration here. This makes it possible to easily take into account different wind power installation variables. In particular, provision may be made here for the active power maximum value to be respectively complied with for the individual wind power installation to be set to values of above 100% if the active power fed in at the grid connection point is below an active power limit at the grid connection point. A value of 120%, for which it is assumed that each wind power installation cannot achieve or can only at most achieve such severe exceeding of its active power limit to be complied with, can be set generally as the upper limit, for example. The practice of determining such a value by means of simulations or a corresponding installation analysis also comes into consideration.

However, one embodiment can propose that the farm specification values, or at least one of the latter, is/are individually determined for each wind power installation. This makes it possible to specify specific power or reactive power values, but, in the case of individual consideration, the practice of determining and outputting relative, in particular percentage, values by the farm controller also comes into consideration. Using such individual values makes it possible to take into account, for example, the fact that different maximum values would be useful for different wind power installations.

A wind farm is provided. Such a wind farm has a plurality of wind power installations and the wind farm feeds power into an electrical supply grid at a grid connection point. This grid connection point may be considered to be the boundary and part of the wind farm.

The wind farm has transmission means for connecting the wind power installation to the grid connection point and, in particular, the wind power installations are connected to the grid connection point via the transmission means. In particular, such transmission means are in the form of transmission lines. However, further elements such as transformers or switching means may also be present.

A farm controller is also provided and is prepared to transmit active and reactive power specifications to the wind power installations. These active and reactive power specifications can be referred to as specifications of the farm controller. The farm controller can therefore specify how much active power can be produced and transmitted by the wind power installations and/or how much reactive power must be able to be produced and transmitted by the wind power installations.

Each of the wind power installations is respectively characterized by a specified first power range which spans a range of values for active and reactive powers to be fed in, specifically for this relevant respective wind power installation. This first power range may differ between the wind power installations. If only identical wind power installations are set up in the wind farm, the fact that these first power ranges do not differ also comes into consideration.

This first power range is respectively characterized in that it has an active power limit to be complied with by the wind power installation and a reactive power limit which can be reached by the wind power installation. For the meaning of these different limits, reference is also made to statements accordingly made above with respect to above-described embodiments of the method for feeding in power.

The grid connection point is characterized by a second specified power range which spans a range of values for active and reactive power to be complied with, wherein the second power range has an active power limit to be complied with by the wind farm at the grid connection point and a reactive power limit which can be reached by the wind farm at the grid connection point. For explanation, reference is also made here to the above embodiments of the method for feeding in power.

At least one, a plurality of or all of the wind power installations has/have an installation control system which is respectively prepared to control the relevant wind power installation on the basis of the specifications of the farm controller. In particular, such an installation control system can be prepared to have or to be connected to corresponding receiving devices (e.g., receivers), for example, to receive said specifications of the farm controller and, on the basis thereof, to then control the relevant wind power installation.

At least one feed-in apparatus (e.g., inverter) is also respectively provided and is prepared to produce active and reactive power on the basis of the specifications of the farm controller and to transmit said power to the grid connection point.

The installation control system is also prepared to control the respective wind power installation in such a manner that it respectively exceeds its active power limit of the first power range to be complied with but exceeds the active power limit to be complied with in each case only such that the second power range is complied with by the wind farm at the grid connection point. This can be achieved, in particular, by virtue of the fact that the wind power installation follows the specifications of the farm controller for this. In particular, it is proposed here that the installation control system and the farm controller are prepared such that the second power range is complied with by the wind power installation at the grid connection point. This may be, in particular, interaction between the farm specifications determined and transmitted by the farm controller and the control of the respective wind power installation which is carried out on the basis thereof by means of the installation control system.

In particular, it is proposed that the wind farm is prepared to carry out at least a method according to at least one of the embodiments described above. In particular, the farm controller and/or the respective installation control system of the wind power installation is/are accordingly prepared. Such preparation may comprise providing appropriate process computers or control computers, on which the corresponding method or the corresponding part of the method is programmed. In addition, corresponding transmission means and/or evaluation means (e.g., controllers) and/or sensors which make it possible to carry out or at least assist with carrying out these methods are present.

BRIEF DESCRIPTION OF THE SEVERAL VIEWS OF THE DRAWINGS

The invention is explained in more detail by way of example below on the basis of embodiments with reference to the accompanying figures.

DETAILED DESCRIPTION

Figure 1:
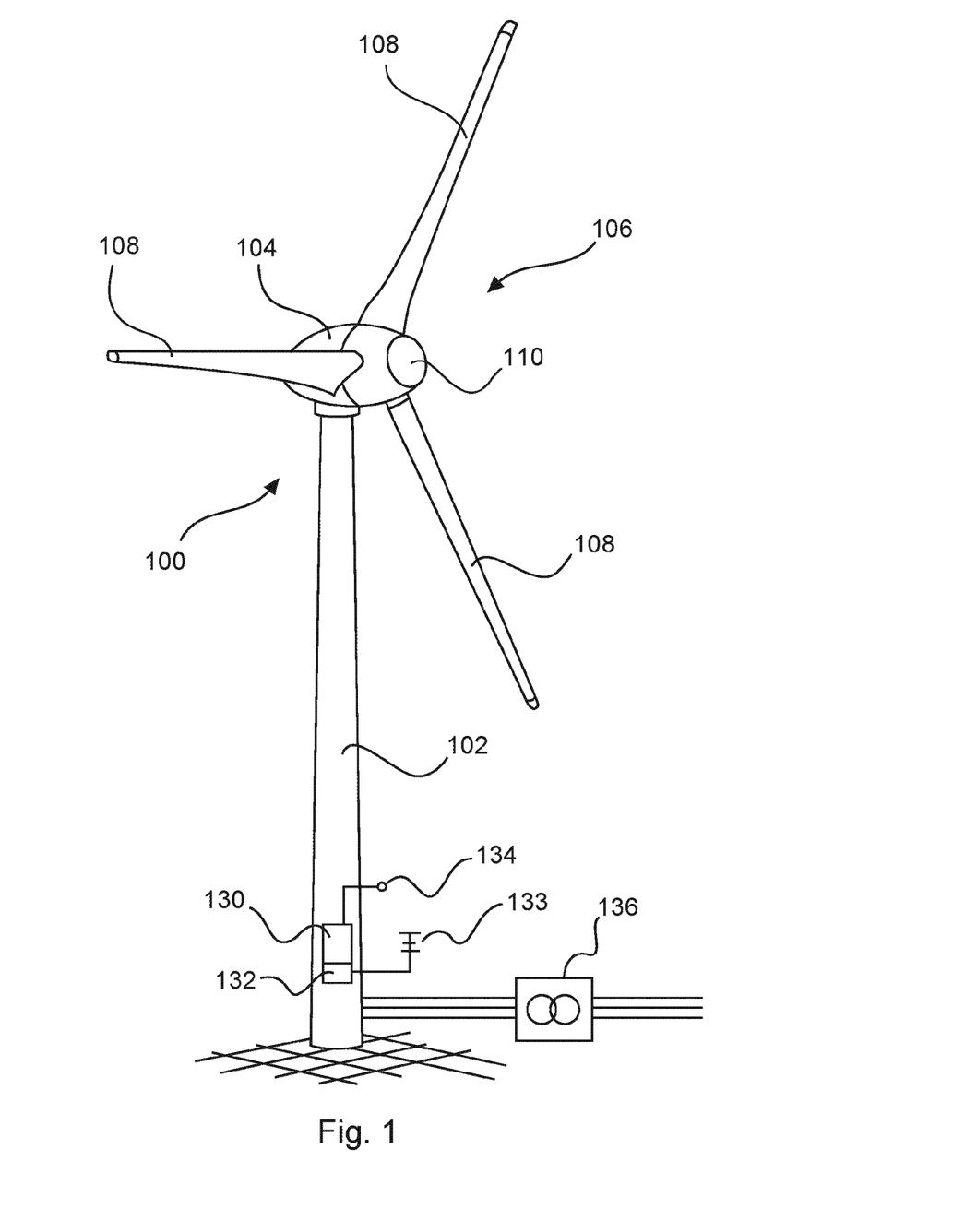
FIG. 1 shows a perspective illustration of a wind power installation.

FIG. 1 shows a wind power installation 100 having a tower 102 and a nacelle 104. A rotor 106 having three rotor blades 108 and a spinner 110 is arranged on the nacelle 104. The rotor 106 is caused to rotate by the wind during operation and thereby drives a generator in the nacelle 104.

The wind power installation 100 also has a control unit (e.g., controller) 130 which is coupled to a communication unit (e.g., transceiver) 132 and has a communication interface 133 in order to communicate with a central farm control unit (e.g., central farm controller). In order to capture an outside temperature, an outside temperature sensor 134 is also provided and can transmit its measured values to the control unit 130 for evaluation or is controlled to carry out measurements by the control unit 130. Furthermore, a transformer 136 is also provided and is assigned to the wind power installation 100 and can be referred to as a wind power installation transformer.

Figure 2:
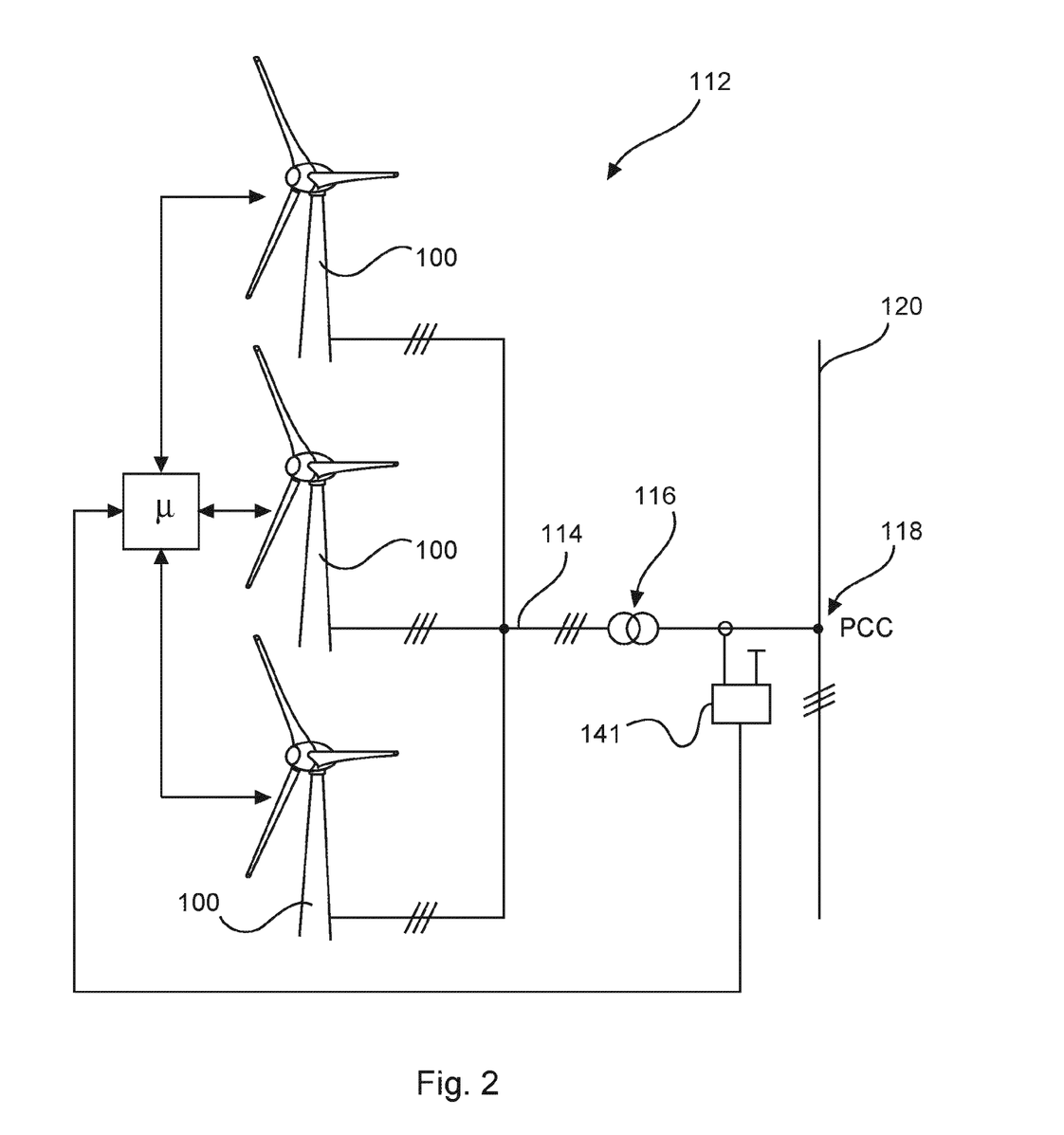
FIG. 2 shows a schematic illustration of a wind farm.

FIG. 2 shows a wind farm 112 having, by way of example, three wind power installations 100 which may be the same or different. The three wind power installations 100 are therefore representative of fundamentally any desired number of wind power installations in a wind farm 112. The wind power installations 100 provide their power, specifically the current produced in particular, via an electrical farm grid 114. In this case, the currents and powers respectively produced by the individual wind power installations 100 are added. In the case of wind farms having a grid connection point, which can also be synonymously referred to as a grid connection point or point of common coupling (PCC), a transformer 116 is provided in the high-voltage or extra-high-voltage grid and steps up the voltage in the farm in order to then feed it into the grid of a grid operator 120 at the grid connection point 118. FIG. 2 is only a simplified illustration of a wind farm 112, which does not show a control system, for example, even though a control system is naturally present. The farm grid 114 may also have a different configuration, for example, in which a transformer is also present, for example, at the output of each wind power installation 100, to name just one other exemplary embodiment.

Figure 3:
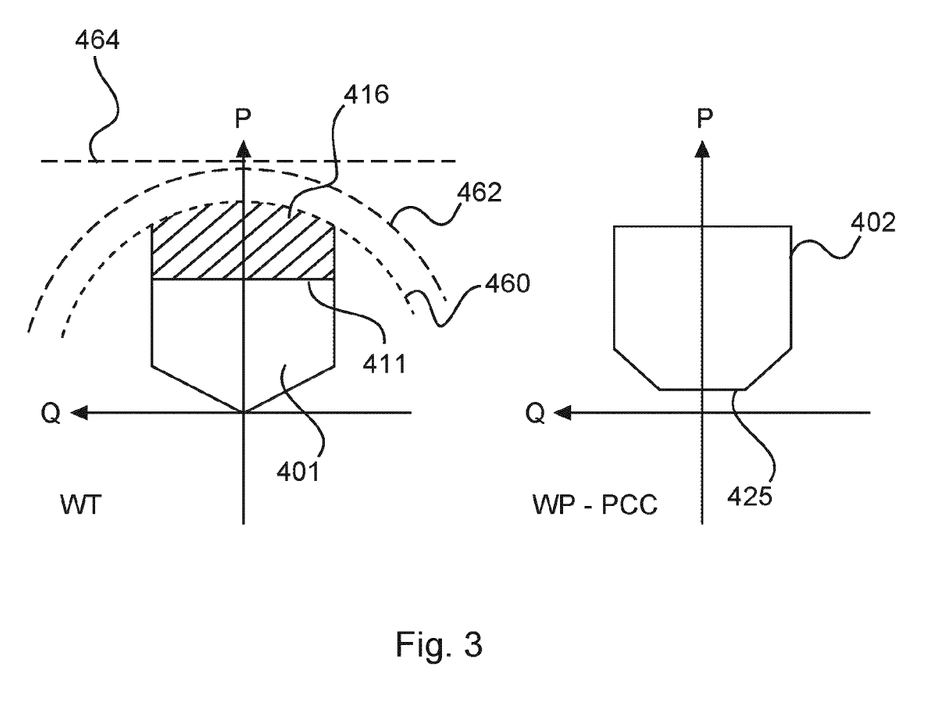
FIG. 3 schematically shows a first and a second power range in a P-Q graph.

FIG. 2 also shows a central farm control unit 140 which can also be referred to as a farm controller or farm control system. A farm measuring unit (current sensor, probe or clamp, voltage sensor, probe or clamp, voltmeter, ammeter, multimeter) 141 is also provided and can measure current and voltage at the grid connection point 118. The active and reactive power currently being fed in at the grid connection point 118 can be captured therefrom. The farm control unit or the farm controller receives this information and, on the basis thereof, can transmit target values or other information to the individual wind power installations 100. The spatial separation shown in FIG. 2 is used only for better illustration, in which the transmission of target values or other information is in the foreground. The farm control unit 140 and the farm measuring unit 141 may also be arranged at the same location, specifically, in particular, at the feed-in point, and may preferably form a unit. FIG. 3 schematically shows two P-Q graphs, specifically a first power range 401 in the left-hand illustration and a second power range 402 in the right-hand graph. In particular, the intention is to make it clear in the left-hand graph that the first power range 401 has an upper limit provided by an active power limit 411, which therefore indicates the maximum active power during continuous operation and under design conditions. This is usually the nominal power $P_{nom}$. Above this, a possible increase range 416 is depicted using hatching. This may be used if necessary. That is to say, the first power range 401 can be left in this increase range 416. However, this happens only briefly and/or under particular boundary conditions, for example fundamentally low temperatures. It also happens only as long as the sum of all active powers does not leave the maximum active power limit of the second power range 402 at the grid connection point, taking into account change and/or distortion effects caused by transmission means (e.g., transmission lines) of the wind farm.

This increase range 416 forms an extended power range and has an upper limit, for instance provided by a circular section which is limited by a maximum current load of power semiconductors of an inverter producing the current. Accordingly, this limit which is illustrated using dotted lines, for instance, forms a limit which is referred to here as the power semiconductor limit 460. Since this limit is specified by the current level, it forms substantially a circle around the origin of the P-Q graph. The phase angle of the current is fundamentally insignificant for this current limitation or resulting current load.

The same applies to the continuous current limit 462 which is likewise depicted and can be specified, in particular, by a transformer. This continuous current limit 462 is also shown at a distance from the power switch limit 460 and therefore at a distance from the increase range 416. It should not be reached or exceeded if possible.

The increase range 416 may also be additionally or alternatively specified by a first predetermined maximum temperature for a first predetermined tolerance period, wherein the continuous current limit 462 can then be specified by a second predetermined maximum temperature for a second predetermined tolerance period. In this case, a temperature limit up to the first predetermined maximum temperature can be exceeded for longer than up to the second predetermined maximum temperature. A mechanically induced limit 464 is also depicted and indicates a maximum active power which is caused by an upper limit for mechanical loads, for example loads of the rotor blades. This mechanically induced limit 464 describes a predetermined mechanical maximum load and therefore relates substantially only to active power and is therefore in the form of a horizontal line parallel to the Q axis.

In addition to all of the limits to be heeded according to the left-hand graph, it must be ensured, however, that the second power range 402 is not left. The variant of the second power range 402, as shown by way of example in the right-hand graph in FIG. 3, has an active power lower limit 425 close to the Q axis, which active power lower limit substantially states that there is actually also a requirement to feed in a reactive power in a controlled form only above a certain minimum active power. However, such a lower limit is a special case, with the result that this limit need not exist in other embodiments. In this respect, this lower limit is not important.

In particular, a solution has now been provided which makes it possible to operate a wind power installation, at least briefly, with an active power above nominal power.

The best possible use of a P-Q setting capacity of a wind power installation, while simultaneously complying with grid connection rules, can therefore be achieved by the wind farm as a whole as an aim. In particular, this also makes it possible to increase the yield of the wind power installation without jeopardizing the compliance with grid connection rules (grid codes).

In this case, a problem was also solved in which the P-Q graph of the wind power installation was previously fundamentally cropped horizontally at the nominal power. Operation above the nominal power was therefore not permissible. However, it was identified that such a strict limit is not absolutely necessary. This limit is not absolutely necessary in any case at the nominal power for complying with regulations at the grid connection point (PCC), and operation with an instantaneous active power above the nominal power is technically generally impossible, as has now been identified.

It was specifically identified that, when a wind power installation receives and can convert at least nominal wind and currently does not have to output its reactive power at a time, it can be operated at an operating point at which its active power P can exceed its nominal active power ($P_{nom}$). For this purpose, it is proposed that a wind farm controller, that is to say a central farm control unit, simultaneously ensures at the grid connection point that the wind farm in total feeds in a required reactive power and the maximum permissible active power at the grid connection point of the wind farm is simultaneously not exceeded.

In this respect, it was also identified that the active power of the individual wind power installations can be increased above their nominal power until the lowest of the following possible limits is at least reached:
  a. An active power limit of the generator.
  b. An apparent power limit of the converters used in the wind power installation, of a DC cable or of another element limiting the apparent power in the wind power installation.
  c. An apparent power limit of a transformer assigned to the wind power installation.
  d. A mechanical load limit which forms, in particular, a load limit of the rotor blades or towers.

In this respect, it was also identified that the use of thermal inertia, for example in the generator or transformer, can even allow temporary overloading of the relevant component. In this case, it was also identified that the occurrence of nominal wind and the simultaneous demand for a high or even maximum reactive power generally cannot permanently take place together.

In order to enable such increased operation, in particular in order to make it possible to leave the first power range without danger, it is proposed to thermally or mechanically monitor all critical components and, if appropriate, to return the active power operating point to a normal characteristic curve.

It was also identified that all wind power installations in a wind farm only very rarely experience nominal wind at the same time and each provide nominal active power ($P_{nom}$) which can also be referred to synonymously and for simplification as nominal power. The maximum reactive power is likewise rarely demanded from the wind farm at the grid connection point. Nevertheless, each individual wind power installation previously restricted itself to its individual limits, in particular to its individual nominal power $P_N$ as the upper limit even if it were possible to feed in even more active power at the grid connection point according to the maximum active power of the wind farm ($P_{N\_WP}$) permitted by the grid operator, for example because other wind power installations are currently not using their maximum producible nominal power $P_N$ ($P_{N\_WP}$) on account of their wind conditions.

In this case, it was taken into account that grid connection rules, which are generally also referred to as grid codes, generally relate to the maximum permissible feed-in power at the grid connection point of the wind farm. Here, it is usually the case that a reactive power setting range specified by the grid operator must be simultaneously made available to the latter for each active power operating point of the wind farm. Depending on the type of construction and electrical approvals to be used, it may be permissible for individual wind power installations to be operated with a power above their nominal power under certain circumstances as long as the wind farm overall complies with the requirements of the grid connection rules at the grid connection point.

If these relationships are taken into account, more yield for the wind farm can be achieved depending on the situation. In this case, it is also possible to make better use of the generally different wind conditions in a wind farm.

In addition, the capacity of the grid at the grid connection point and in the upstream grid for transporting power to consumers is better utilized. Specifically, the equipment at the grid connection point and beyond may achieve a higher number of hours with high utilization, which is in turn economically advantageous for grid operation.

What additional yield can be achieved thereby for a wind power installation may depend on the frequency of strong wind conditions at the relevant location. The frequency with which the maximum reactive power is demanded also plays a role as well as the temporal correlation thereof with the wind conditions and the outside temperatures.

If the operating range of an individual wind power installation is limited to nominal power, although it is certain that technical components are not overloaded, the technically possible maximum is also possibly not gained from the hardware.

A wind farm controller generally nowadays exists in each newly erected wind farm. Retrofitting is technically generally possible even in old stock. The wind farm controller allows the compliance with the grid code conditions and, in particular, the maximum active power at the grid connection point to be ensured at any time even if individual wind power installations are operated above their nominal power. It is therefore preferably proposed to use and accordingly program the wind farm controller for this purpose.

It is therefore proposed to expressly allow the wind power installation to also be operated outside a nominal P-Q setting range. In particular, it is proposed, when the instantaneous wind speed at the relevant wind power installation allows it, to feed in more active power than nominal power, which is then done as long as no other limiting factors prohibit this. The following can be mentioned as such limiting factors:

a. A limitation inside the wind power installation if, for example, a generator magnetization has a maximum value; bending of the rotor blades has a maximum value, a transformer temperature has reached a maximum value or a temperature of DC cables has reached a maximum value, to name just a few examples. In the case of electrical components which are in the power flow from the generator to the electrical supply grid, that is to say to the grid connection point, the nominal current or a permanent maximum current is preferably not decisive in this case, but rather the temperature may also be decisive and it is proposed to dynamically monitor the temperature of the relevant component.

b. A limitation signal from the wind farm controller in order to prevent a permissible total active power of the wind farm being exceeded at the grid connection point.

c. A reactive power which is to be taken into account and is required by a grid operator, wherein the wind farm controller is prompted to pass appropriate setting commands, which result in the corresponding reactive power output of the wind power installations, to the individual wind power installations. In this case, it should be taken into account whether the relevant wind power installation already carries the maximum apparent current at this moment. For this case, it is proposed to accordingly shift the operating point, specifically, in particular, along a curve which indicates a maximum apparent power (an $S_{max}$ curve). In this case, it is proposed that the reactive power is prioritized because it is generally a compulsory specification of the grid operator, whereas active power feed is accepted to be dependent on the instantaneous wind speed.

The invention claimed is:

1. A method for feeding electrical power into an electrical supply grid at a grid connection point using a wind farm, wherein the wind farm includes:
   a plurality of wind power installations that are coupled to the grid connection point by transmission lines;
   a wind farm controller configured to send active and reactive power specifications to the plurality of wind power installations, and
wherein the method comprises:
   specifying, by the wind farm controller, a first power range for each wind power installation of the plurality of the wind power installations, wherein:
   the first power range includes a range of values for active and reactive power to be fed in by a respective wind power installation of the plurality of wind power installations,
   the first power range sets an active power limit to be complied with by the respective wind power installation and
      the first power range sets a reactive power limit reachable by the respective wind power installation;
   specifying, by the wind farm controller, a second power range for the grid connection point, wherein:
   the second power range includes a range of values for active and reactive power to be fed in,
   the second power range sets an active power limit at the grid connection point to be complied with by the wind farm, and
      the second power range sets a reactive power limit reachable by the wind farm at the grid connection point;
   producing by the respective wind power installation of the plurality of wind power installations active and reactive power based on the first power range, and transmitting the active and reactive power to the grid connection point;

exceeding by the respective wind power installation of the plurality of wind power installations the active power limit of the first power range; and in response to the active power limit being exceeded, complying, by the wind farm, with the second power range at the grid connection point.

2. The method as claimed in claim 1, comprising:
controlling the respective wind power installation of the plurality of wind power installations such that the respective wind power installation does not reach the reactive power limit of the first power range; and
controlling the wind farm to reach the reactive power limit of the second power range, in particular specifically can achieve a reactive power value up to the reactive power limit, which reactive power value is required by a grid operator at a time.

3. The method as claimed in claim 2, wherein the wind farm reaches a reactive power value up to the reactive power limit, and the reactive power value is requested by a grid operator.

4. The method as claimed in claim 1, wherein:
the respective wind power installation is controlled to output an output power having an active power component and a reactive power component for transmission to the grid connection point, wherein:
the output power exceeds the active power limit of the first power range, and/or
the output power has an apparent power value that results in the reactive power limit of the first power range not being reached without reducing the active power component, and
the transmission lines entirely or partially causes a change in the output power that the second power range is complied with.

5. The method as claimed in claim 4, wherein:
the transmission lines reduce the active power component of an output power output by thermal consumption such that the active power limit of the second power range is complied with, and/or
the transmission lines result in a change in the reactive power component of the output power such that the reactive power limit of the second power range is reached.

6. The method as claimed in claim 1, wherein:
a sum of output powers of the plurality of wind power installations before transmission by the transmission lines does not comply with the second power range, and
the sum of the output powers transmitted to the grid connection point complies with the second power range at the grid connection point.

7. The method as claimed in claim 1, comprising:
exceeding by the respective wind power installation of the plurality of wind power installations the active power limit of the first power range based on a plurality of test conditions, wherein
compliance with a farm specification of the wind farm controller is tested as at least one test condition of the plurality of test conditions, and/or
compliance with an installation condition of the respective wind power installation is tested as at least one test condition of the plurality of test conditions.

8. The method as claimed in claim 7, wherein:
the installation condition is a condition selected from a list of conditions including:

compliance with an extended power range at the respective wind power installation, the extended power range being greater, at least in a section, than the first power range,
compliance with a predetermined maximum temperature in the respective wind power installation,
compliance with a predetermined maximum current in the respective wind power installation, and
compliance with a predetermined mechanical maximum load of the respective wind power installation.

9. The method as claimed in claim 8, wherein the respective wind power installation is controlled such that:
the respective wind power installation exceeds the first power range while complying with the extended power range only if at least one criterion in the list of conditions is complied with,
the respective wind power installation exceeds the extended power range for a predetermined exception period if the predetermined mechanical maximum load is complied with
the predetermined maximum current is exceeded for a predetermined second exception period if the predetermined mechanical maximum load is complied with and and/or
the predetermined mechanical maximum load is complied with.

10. The method as claimed in claim 9, wherein:
the predetermined maximum temperature is predetermined on the basis of a predetermined tolerance period,
at least one first predetermined maximum temperature is specified for a first predetermined tolerance period,
at least one second predetermined maximum temperature is specified for a second predetermined tolerance period, and
the first predetermined maximum temperature is less than the second predetermined maximum temperature and the first predetermined tolerance period is greater than the second predetermined tolerance period.

11. The method as claimed in claim 7, wherein:
the farm specification includes at least one farm specification value output to each wind power installation of the plurality of wind power installations selected from a list including:
an active power maximum value to be complied with by each wind power installation of the plurality of wind power installations, and
a reactive power minimum value to be achieved by each wind power installation of the plurality of wind power installations,
the at least one farm specification value is determined by the wind farm controller based on the second power range and an instantaneous power fed in at the grid connection point, and
the at least one farm specification value is output as a relative value of a nominal power of the wind power installation and/or is individually determined for each wind power installation of the plurality of wind power installations.

12. The method as claimed in claim 7, wherein the farm specification and the installation condition are tested or the farm specification and at least two installation conditions are tested.

13. The method as claimed in claim 1, wherein two wind power installations of the plurality of wind power installations have the same first power ranges.

14. The method as claimed in claim 1, wherein two wind power installations of the plurality of wind power installations have different first power ranges.

15. A wind farm, comprising:
- a plurality of wind power installations for feeding electrical power into an electrical supply grid at a grid connection point, comprising
  - transmission lines for coupling the plurality of wind power installations to the grid connection point; and
  - a wind farm controller for transmitting active and reactive power specifications to the plurality of wind power installations, wherein
- each wind power installation of the plurality of wind power installations is respectively characterized by a first power range which includes a range of values for active and reactive power to be fed in,
- the first power range has an active power limit to be complied with by the wind power installation and
- the first power range has a reactive power limit reachable by the wind power installation,
- the grid connection point is characterized by a second power range which includes a range of values for active and reactive power to be fed in,
- the second power range has an active power limit to be complied with by the wind farm at the grid connection point,
- the second power range has a reactive power limit reachable by the wind farm at the grid connection point,
- each wind power installation of the plurality of wind power installations has a respective installation controller configured to control the wind power installation based on an active and reactive power specification of the wind farm controller, and
- each wind power installation of the plurality of wind power installations has an inverter configured to produce the active and reactive power based on the active and reactive power specification and output the active and reactive power to the grid connection point,
- the installation controller is configured to control the respective wind power installation such that the respective wind power installation exceeds the active power limit, and
- the installation controller and/or the wind farm controller is configured to control the respective wind power installation such that the active power limit is exceeded in response to only such that the second power range being complied with by the wind farm at the grid connection point.

* * * * *

UNITED STATES PATENT AND TRADEMARK OFFICE
CERTIFICATE OF CORRECTION

PATENT NO. : 11,764,582 B2  
APPLICATION NO. : 17/622136  
DATED : September 19, 2023  
INVENTOR(S) : Eckard Quitmann It is certified that error appears in the above-identified patent and that said Letters Patent is hereby corrected as shown below:

In the Claims

Column 29, Claim 9, Line 21:
"complied with" should read: --complied with,--.

Column 21, Claim 15, Line 7:
"connection point, comprising" should read: --connection point, comprising;--.

Column 22, Claim 15, Line 22:
"in response to only such that the second power" should read: --in response to the second power--.

Signed and Sealed this
Thirteenth Day of May, 2025

Coke Morgan Stewart
*Acting Director of the United States Patent and Trademark Office*